July 7, 1970 W. A. BAREFIELD 3,518,718
METHOD FOR OPENING THE BODY CAVITY OF A POULTRY CARCASS
Filed Oct. 28, 1966
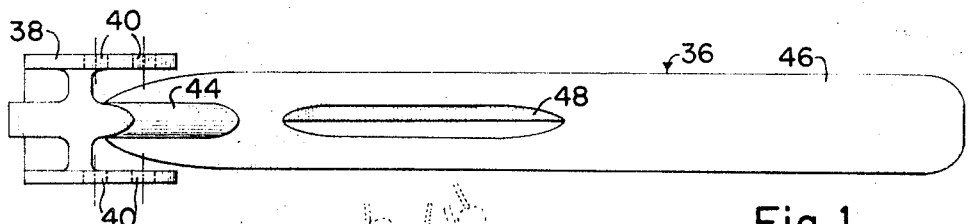
Fig. 1
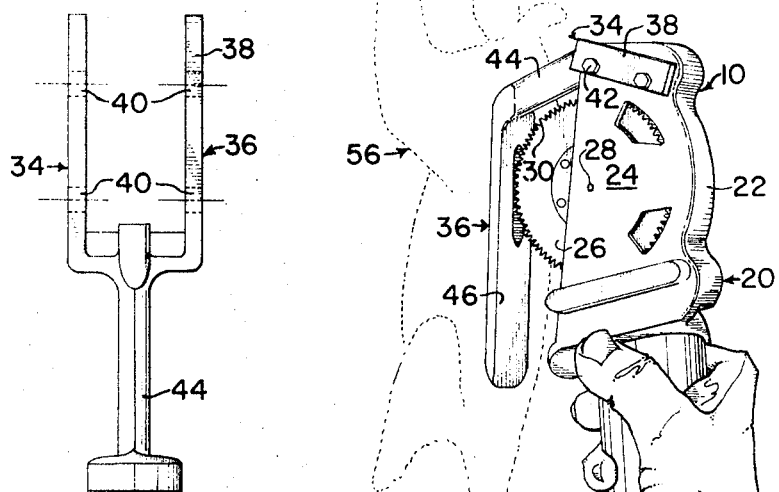
Fig. 3
Fig. 2
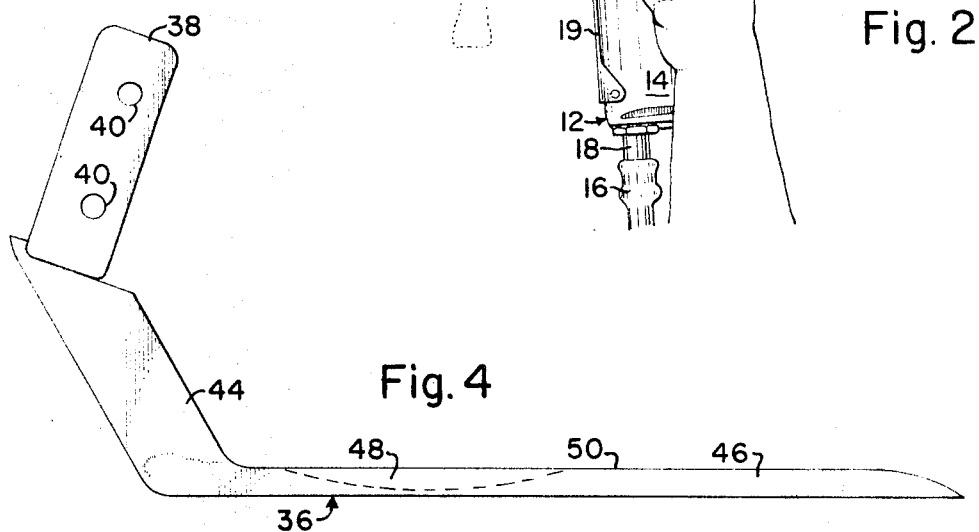
Fig. 4
INVENTOR
WILLIAM A. BAREFIELD
ATTORNEY 3,518,718
METHOD FOR OPENING THE BODY CAVITY OF
A POULTRY CARCASS
William A. Barefield, Hall County, near Gainesville, Ga.,
assignor to J. D. Jewell, Inc., Gainesville, Ga.
Filed Oct. 28, 1966, Ser. No. 590,388
Int. Cl. A22c 21/00
U.S. Cl. 17—52                                    4 Claims

ABSTRACT OF THE DISCLOSURE

A method for opening the body cavity of chickens to allow easy evisceration and inspection and to a hand held and manually manipulated, power driven cutting tool having guide means for insertion in the chicken carcass to facilitate the opening of same without cutting the intestines or otherwise contaminating and to provide access and visibility of the carcass for inspection by making an opening on the back of the poultry carcass and starting a cut from this opening up the back towards the neck to completely sever the backbone without cutting the viscera.

---

One present day equipment for opening the body cavity of poultry is a knife and/or scissors operated manually. Using a knife or scissors, the body cavity is cut around the vent (rectum opening) and then the abdominal tissue or wall is cut from the vent through the oil bag, down the back and exiting at the neck. In poultry, especially young chickens, or other small fowl, this provides only a small opening through which the viscera must be removed and by means of which the interior of the carcass inspected, as by State or Federal inspectors. Also, it is quite tiring to the operator to perform the manual opening of the carcass with knives and/or scissors. In addition, the small opening makes the removal (or drawing) of viscera difficult as well as limiting the extent of visual examination of the interior of the carcass. The present method relates to a better way of opening the poultry carcass allowing better inspection and also to facilitate removal of the viscera and edible giblets. The apparatus of the present invention is a manually operated and hand held tool which facilitates the opening of the carcass by the present method.

Generally described, without restriction on the scope of the invention as defined in the appended claims, the method of the present invention may take place after the poultry, such as chickens, has been killed, scalded, singed, washed and the preene gland, the feet and shanks have been removed. Then the chicken carcass is moved and held as by suspending same in the shackle on an eviscerating line by the hocks (legs). The neck bone is severed just anterior to the shoulder girdle along with the skin on the dorsal side of the neck, using conventional methods and equipment. Then the crop and traches are pulled from the neck but left attached to the viscera and the neck remains attached to the carcass by the skin on its ventral side. A cut is made through the abdominal wall just dorsal to the vent, using a knife or other instrument. Then with the dorsal side of the carcass facing the operator, a cut is started in the opening dorsal to the vent (rectum opening) and is directed anteriorally on the carcass toward the end of the neck bone attached to the carcass. The cut travels down the back of the carcass and completely severs the bone and exposes the viscera. Care is taken in making the cut not to cut the viscera and to move the cut generally in a straight line. Then after the carcass has been opened, the sides of the carcass are pulled apart by hand to expose the viscera and to expose the interior of the cavity for inspection and removal of edible parts. After edible giblets have been removed the operator completes the removal of the viscera by cutting around the vent and then the lungs can be removed and the viscerated carcass inspected prior to washing and further processing.

The apparatus of the present invention which facilitates the use of the method described above, is a hand held tool which includes a motor, such as an electric or pneumatic motor, on which is mounted a circular blade preferably having a saw tooth blade cutting edge. The blade is mounted for rotation about a center support which is mounted with the motor. A drive means rotates the saw tooth blade as the motor is driven and preferably at a substantially high rate of speed. A partial enclosure around the portion of the blade and part of the edge thereof provides a safety shield. Supported on the safety shield and extending outwardly therefrom and generally in a direction along a portion of the edge of the blade is a carcass insertion member having a support member attached to the safety guard and having a finger insertion member attached thereto and depending therefrom in spaced relation to the outer edge of the saw tooth blade so that the insertion member may be inserted down into the vent (rectum opening) of the chicken carcass to place the carcass between the blade edge and the finger member whereupon the entire tool may be moved downwardly with respect to the carcass to cut substantially in a straight line and the finger serves to glide and retain the tool in place as well as preventing the blade from cutting into the viscera (intestines) and other parts.

The primary object of this invention is to provide a method for opening the body cavity of chickens for purposes of visceration and to improve the visibility of the interior of the carcass for inspection.

Still another object of the present method is to open the body cavity of chicken carcasses in a manner so as to reduce the likelihood of accidentally cutting into the viscera or other parts and to give better visual observation of the cutting and the carcass during the cutting operation as well as afterwards for inspection.

Other advantages of the present method are:
(1) The carcass may be completely opened thereby giving better access to the interior.
(2) The intestines likely will not be cut or disturbed.
(3) The time required for opening the carcass is reduced over customary present procedures and therefore the speed of opening the carcass is increased.
(4) The visual inspection of both the viscera and the carcass is made easier and more complete.
(5) The harvesting of edible giblets is facilitated.
(6) It is less likely that the poultry gall bladder will be ruptured.
(7) The removal of the poultry lungs is facilitated as a result of the better access and greater visibility.

Also an object of the present invention is the opening of the carcass by the present method still using assembly line-type conveying apparatus and conventional pre-preparation of the carcass prior to the present method.

An advantage of the present tool resides in the safety of operation and the shielding of the cutting blade so as to reduce the chance of injury to the operator and to the poultry.

Specifically, in connection with the operation of the cutting blade mentioned in the preceding paragraph, an important feature of this invention resides in the guide means in the form of a finger member of the present tool which practically eliminates the accidental cutting of viscera or other parts of the chicken.

Still another object of the present tool is that it is still relatively small and light weight and is easily manipulated manually much easier and less tiresome than using manual knives or scissors.

Additional advantage of the present tool resides in the particular shape and configuration of the guide member or finger on the tool for insertion into the poultry carcass to prevent damage to the viscera and facilitate the cutting.

Other and further objects and advantages of my invention will become apparent, both as to the method and the apparatus, from reading the following specifications, especially with familiarity of the art of poultry preparation and dressing, taken in conjunction with the accompanying drawings, in which:

FIG. 1 is a bottom plan view of just the guide means of the present tool showing the guide finger which is inserted inside the chicken carcass.

FIG. 2 is a perspective view of the complete tool of the present invention held in the hand and inserted into the vent opening of a typical chicken carcass.

FIG. 3 is an end elevation view of the guide means shown in FIG. 1.

FIG. 4 is a side elevation view of the guide means shown in FIG. 1.

Referring initially to the perspective view in FIG. 2 and then back and forth to other figures of the drawings, the tool is designated generally and overall by the reference numeral 10 and it comprises an elongated drive motor arrangement designated generally by reference numeral 12 and comprising a motor housing 14 in which there is contained a conventional power driven motor either an electric motor (not shown) or a pneumatic or air driven motor which is customarily found in industry and which is driven by means of compressed air through an air line 16 which is a rubber hose of flexible construction attached to a connection nipple 18 leading into the turbine driving arrangement (not shown) in the motor and housing 14. A trigger 19 actuates tool 10. The motor housing 14 is attached to the tool frame designated generally by reference numeral 20 which includes a shield or guard 22 comprising spaced metal plates 24 held together and attached on frame 20 to the motor housing 14. A circular, saw-type rotary cutting blade 26 is supported on a center shaft 28 and has a circular saw tooth edge 30 providing a cutting edge which is quite sharp and easily cuts into poultry carcasses including bone or backbone. Tool 10 including the parts just described is a conventional cutting tool and may be purchased as a staple article of commerce and is used in the butchering and poultry processing plants.

Attached on tool 10 specifically to the guard 22 and especially to the spaced metal plate 24, by means of attaching means 34, is a poultry carcass cutting guide means designated generally and overall by reference numeral 36 which has upper attachment plates 38 with spaced holes 40 therein and inside which plates 38 there is positioned the plates 24 in the housing 22 so that the openings 40 match with and align with a pair of spaced bolts 42 inserted through the housing 22 and through plates 24 on both sides thereof and fastened in place by means of nuts thereon. By this attachment means, the guide means 36 is securely and rigidly attached on tool 10 into the housing 22 and located adjacent the rotating blade edge 30.

Guide means 36 comprises in addition to the attachment plate 38, a connecting member 44 of smooth construction having an elongated insertion member 46 attached thereto at an interior angle of more than 90 degrees so that, as seen in FIG. 2, the connecting member 44 extends outwardly spaced from the edge of the rotating blade 26 and the insertion new member extends a much longer distance beyond the edge of blade edge 30. Insertion member 46 has a shallow indentation 48 therein which provides a concave portion allowing the blade edge 30 to rotate in a position inside of the inner surface 50 of member 48 so that anything trapped between the surface 50 and edge of blade 30 will be cut thereby. It is in this manner that the backbone and the carcass of the poultry which is designated generally by reference numeral 56, is cut by blade edge 30.

In the practice of the present method using the tool 10, prior to the practice of the method, the chicken has been killed, scalded, singed, washed and the preene gland, the feet and shanks removed. In chicken processing plants the carcass may be supported on a shackle which per se forms no part of this invention and as seen in FIG. 2 includes some sort of retaining means which holds a respective leg (hock) of the chicken and in accordance with the present method the back of the chicken is facing the operator who can grasp the chicken momentarily to hold same from movement. The insertion member 46 is inserted in a small opening which is made by a small cut through the abdominal wall just dorsal to the vent, using a knife or other instrument. Then with the dorsal (tail) or back side of the carcass facing the operator, with the insertion member inserted in the cut, the tool 10 is pulled to travel down the back of the carcass from the small opening in which the insertion member was inserted towards the neck competely severing the back bone and exposing the viscera. Care is taken in making the cut not to cut the viscera and to move the cut generally in a straight line. Then after the carcass has been opened up, the sides of the carcass are pulled apart by hand to expose the viscera and the edible parts. After edible giblets have been removed the operator completes the removal of the viscera by cutting around the vent and then the lungs can be removed and viscerated carcass inspected prior to washing and further processing.

While I have shown and described a particular method of my invention together with an embodiment of a particular tool, this is by way of illustration and is not to be construed as any limitation on the scope of my invention since various alterations, changes, deviations, eliminations, departures, additions, substitutions, and alterations may be made in the forms described herein without departing from the scope of my invention defined in the appended claims.

What is claimed is:

1. In a method for opening the body cavity of poultry carcasses having a vent, a neck, a back, etc., to facilitate access and visibility of the carcass for inspection and to aid in the removal of viscera, which may be after said poultry has been killed, scalded, singed, washed and the preene gland, the feet and shanks removed, and while the carcass is suspended by the legs with the neck hanging down, the steps comprising:

(a) cutting a small opening through the body adjacent to the vent, (b) placing a blade guard inside the carcass and starting another cut from the opening previously made and cutting anteriorially on the carcass toward the neck and continuing the cut down the back of the carcass while simultaneously moving said blade guard as said cut is made and completely severing the back bone to expose the viscera, said cut being made outside the viscera which is protected by said guard so as not to cut same.

2. The method claimed in claim 1 wherein after said cutting is completed, the carcass is opened by pulling the sides of the carcass apart by hand to expose the interior of the carcass cavity for inspection and removal of edible parts.

3. The method claimed in claim 1, wherein after the carcass has been cut, the viscera is removed by cutting around the vent and then the lungs may be removed and the viscerated carcass inspected.

4. The method in claim 1, wherein said carcass is supported during cutting with the carcass back toward the operator.

References Cited
UNITED STATES PATENTS

| | | | |
|---|---|---|---|
| 1,465,866 | 8/1923 | Rendlich | 17—23 |
| 2,237,203 | 4/1941 | Swanson | 17—11 |
| 2,310,881 | 2/1943 | Swanson | 17—45 |
| 2,381,489 | 8/1945 | Dietz | 17—23 |
| 2,766,477 | 10/1956 | Dahlberg | 17—11 |
| 2,941,238 | 6/1960 | Reeves | 17—11 |
| 2,957,198 | 10/1960 | Cianciolo et al. | 17—11 |
| 3,284,846 | 11/1966 | Reeves | 17—11 |

LUCIE H. LAUDENSLAGER, Primary Examiner

U.S. Cl. X.R.

17—11, 23